United States Patent
Vienneau et al.

(10) Patent No.: US 8,024,356 B2
(45) Date of Patent: Sep. 20, 2011

(54) DATABASE-MANAGED IMAGE PROCESSING

(75) Inventors: Christopher Vienneau, Montreal (CA); Charles Martin, Montreal (CA); David Boileau, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 108 days.

(21) Appl. No.: 11/347,552

(22) Filed: Feb. 3, 2006

(65) Prior Publication Data

US 2007/0185881 A1 Aug. 9, 2007

(51) Int. Cl.
G06F 7/00 (2006.01)
G06T 1/00 (2006.01)
G09G 5/00 (2006.01)

(52) U.S. Cl. ........ 707/781; 707/782; 707/783; 345/522; 345/619; 345/629

(58) Field of Classification Search .................. 715/511, 715/513; 707/8, 9; 345/522, 619, 629
See application file for complete search history.

(56) References Cited

U.S. PATENT DOCUMENTS

| | | | | |
|---|---|---|---|---|
| 5,821,945 A * | 10/1998 | Yeo et al. | ....................... | 345/440 |
| 6,130,676 A * | 10/2000 | Wise et al. | ..................... | 345/619 |
| 6,366,934 B1 * | 4/2002 | Cheng et al. | .................. | 715/210 |
| 6,373,499 B1 * | 4/2002 | Acker | ............................ | 345/619 |
| 6,529,905 B1 * | 3/2003 | Bray et al. | ......................... | 707/8 |
| 6,732,102 B1 * | 5/2004 | Khandekar | ............................. | 1/1 |
| 6,867,782 B2 * | 3/2005 | Gaudette et al. | ............. | 345/530 |
| 7,064,760 B2 * | 6/2006 | Capin et al. | .................... | 345/473 |
| 7,148,907 B2 * | 12/2006 | Smith et al. | .................... | 345/629 |
| 7,149,755 B2 * | 12/2006 | Obrador | ..................... | 707/104.1 |
| 7,281,206 B2 * | 10/2007 | Schnelle et al. | .............. | 715/513 |
| 7,383,504 B1 * | 6/2008 | Divakaran et al. | ............. | 345/440 |
| 7,409,248 B2 * | 8/2008 | Davignon et al. | ............... | 700/83 |
| 7,474,928 B2 * | 1/2009 | Davignon et al. | ............... | 700/83 |
| 7,847,800 B2 * | 12/2010 | Harper | .......................... | 345/502 |
| 7,911,472 B2 * | 3/2011 | Harper | .......................... | 345/522 |
| 2001/0029505 A1 * | 10/2001 | Gaudette et al. | .............. | 707/102 |
| 2002/0023113 A1 * | 2/2002 | Hsing et al. | .................... | 707/513 |
| 2002/0059302 A1 | 5/2002 | Ebihara | | |
| 2002/0129340 A1 * | 9/2002 | Tuttle | .............................. | 717/132 |
| 2003/0033285 A1 * | 2/2003 | Jalali et al. | ......................... | 707/1 |
| 2004/0194020 A1 * | 9/2004 | Beda et al. | ...................... | 715/502 |
| 2004/0230893 A1 * | 11/2004 | Elza et al. | ........................ | 715/511 |
| 2004/0243635 A1 | 12/2004 | Christophersen et al. | | |
| 2005/0041040 A1 | 2/2005 | Fukuda et al. | | |
| 2006/0026226 A1 | 2/2006 | Walls et al. | | |
| 2006/0167929 A1 * | 7/2006 | Chakraborty et al. | ........ | 707/102 |
| 2007/0027913 A1 | 2/2007 | Jensen et al. | | |

OTHER PUBLICATIONS

Andersson et al., SVG 1.1 Specification Recommendation Jan. 14, 2003, W3C.*
IBM Corp., IBM DB2 Connect User's Guide, 2002, IBM Corp.*
Quint, Digging Animation, Jan. 23, 2002, XML.com.*
Giradot et al., Efficient Representation and Streaming of XML Content over the Internet Medium, 2002, IEEE.*

* cited by examiner

*Primary Examiner* — Vincent Boccio
*Assistant Examiner* — Huen Wong
(74) *Attorney, Agent, or Firm* — Gates & Cooper LLP

(57) ABSTRACT

A method, apparatus, system, and article of manufacture provide the ability to track the processing of image data in a collaborative environment. A dependency graph that represents an image composition is obtained. Metadata for each element of the dependency graph are stored in a database that is accessible across a network to multiple users. Access to the database is controlled to allow the multiple users to access the dependency graph via the database simultaneously.

24 Claims, 6 Drawing Sheets

DATABASE-MANAGED IMAGE PROCESSING

CROSS-REFERENCE TO RELATED APPLICATIONS

This application is related to the following co-pending and commonly-assigned patent application, which application is incorporated by reference herein:

U.S. patent application Ser. No. 11/346,953, entitled "DATABASE-MANAGED RENDERING", by Christopher Vienneau, Charles Martin, and David Boileau, filed on Feb. 3, 2006;

BACKGROUND OF THE INVENTION

1. Field of the Invention

The present invention relates generally to image/video display and processing systems, and in particular, to a method, apparatus, and article of manufacture for viewing and tracking the progress and state of elements in a clip.

2. Description of the Related Art

A clip is a sequence of images or frames loaded from an external device such as a VTR (video tape recorder), stored in digital format, and displayed in a clip library and on a desktop. Clips may be edited, processed, and recorded to/on external devices. However, the prior art fails to provide an efficient and effective mechanism for tracking the progress and state of individual clip elements/operations in a collaborative environment. Instead, such information must be tracked manually. Thus, the prior art fails to provide the capability to determine whether an important edit (e.g., one that must be completed before others can take place) is going to be completed when needed. Such prior art problems may be better understood with a description of prior art clips and clip processing.

Post production of sequences for film and video is an extremely complex undertaking. Each clip may have dozens of separate elements/operations that need to be combined/composited, each individual element requiring significant effort on the part of a digital artist. For example, to composite a moving car onto a new background may require a mask for the car be cut and perfected for every frame of the sequence.

Professional compositing software helps digital artists and managers visualize the process of clip development by building a "dependency graph" of elements and effects for each sequence. In such software, operators, tasks, or modules/functions perform a variety of functions with respect to a clip or source. For example, a module may perform compositing, painting, color correction, degraining, blurring, etc. A dependency graph of such software may also be referred to as a process tree or a schematic view of a process tree. Such a tree illustrates the elements and effects needed to complete a sequence of functions and identifies the hierarchy that shows the relationship and dependencies between elements. Accordingly, as the end-user interacts with media and tools in a schematic view, the system constructs a graph representing the activity and the relationships between the media and tools invoked upon them. The purpose of the dependency graph is to manage and maintain the relationships between the nodes representing the media and the tools.

FIG. 1 illustrates a process tree in a schematic view. A schematic view 100 uses node(s) 102-104 to represent all of the operators in a workspace performed on one or more clips 106-110, and line(s) (edges) 112-118 between nodes clips 106-110 and nodes 102-104 to indicate the flow of image data between the operators. The output of one node 102 is the source for the next node 104. As a result clip 104 or other branch (e.g., paint or color correction projects 102) is created, the process tree indicating the flow of data through the nodes 102-104 is built automatically. As illustrated in FIG. 1, various source nodes in the form of clips 106-110 are utilized. As illustrated, front clip 106, back clip 108, and matte clip 110 may be utilized by color correction node 102. The color correction node 102 performs an operation (i.e., a color correction to the clips 106-110) on the clips 106-110 to produce a result/output 104.

As used herein, an operator (e.g., color correction operator 102) is the most common node. Alternative nodes may be used to connect two nodes. The process tree (such as the process tree illustrated in FIG. 1) can be used to manage operators and nodes. For example, users may add operators (e.g., a paint operation) to a branch, change the process order of operators 102-104, and navigate easily between operator controls. Further, if an operator is added to a layer in a schematic view 100, the operator will appear as a node (e.g., the color correct node 102). The same operator node may also appear in other workspace environments (e.g., a workspace panel). Further, in the schematic view, particular operators may be turned on/off as desired simply by clicking on the icon for that operator.

Thus, as described above, the dependency graph is the record of end-user activity in the creative application. The dependency graph is constructed by the system dynamically, consists of various nodes and connections, and is represented in the user interface as the schematic view 100. As the end-user manipulates media by editing, applying tools, etc., the creative application constructs a dependency graph reflecting the structure of the composition. For example, when the end-user drops a keyer into the schematic 100, the system creates an instance of a tool node for the keyer in the dependency graph 100.

Thus, the dependency graph consists of tool nodes, link nodes, and occasionally, group nodes. Tool nodes represent the invocation of a tool and its parameters. Link nodes connect the graph 100 to the published result of another composition and group nodes can be created by an end-user to arrange nodes together in the schematic 100 for visual clarity.

While the above prior art schematic view 100 and operations maybe used to modify and edit an image/clip on a single workstation, the prior art has many limitations. In particular, prior art software fails to provide any mechanism that helps manage the process of tracking the progress and state of each clip element across multiple users, allowing a lead artist to easily understand the progress and state-of-completeness of a given sequence. Instead, artists/designers must track such information manually while in a large collaborative environment. Accordingly, there is no efficient and useful means (other than visual inspection) for an art director to know whether an important edit (one that must be completed before others can take place) is going to be completed when needed.

In addition to the above, it is noted that many digital artists create multiple variations of an individual clip element that are combined into a single collaborative project. Such individual variations must be managed. It is desirable to manage the variations in a manner that allows the changes to be easily "tried out" in the compositing software. The prior art fails to provide such capabilities.

Prior art techniques attempt to address the deficiencies described above through various work-arounds. For example, prior art software may allow a user to re-create the dependency tree/graph of a render pipeline, and to analyze it for critical-path items. However, such an approach fails to provide a means to manage multiple clip variations, to generate a variety of usage reports, or to perform any asset management.

In addition to the above, the use of a dependency graph in a collaborative environment has many problems. For instance, the prior art fails to provide a methodology or system to perform collaboration through the use of a dependency graph. For example, the prior art primarily relies on two different models: (1) file-based model; or (2) hidden file/application based model.

In a file based model, a user opens a file (e.g., a project, scene, word processing document, drawing, etc.) and while the file is open, the user has read/write access to the file. Most prior art applications do not prevent other applications from opening the same file. In this regard, to perform versioning, the user is required to perform a "save as" or similar type of operation. Thus, the file-based model is similar to a check-in/check-out system where the application checks in or out a given application and no other users can access the file while checked-out. Nonetheless, while some applications may have a built-in file sharing capability, the capabilities are very limited and most prior art applications have no mechanism for preventing multiple users from accessing the same file. Further, the information within the single file is difficult if not impossible to leverage. For example, detailed information such as the effect, degraining, color correction, etc. being performed are not available or accessible outside of the application itself.

In a hidden file/application based model, when an application is executed, a hidden file is accessed such that the data viewed in the application is carried over from the prior execution of the application. For example, a data structure that is associated with a particular application may be opened at run time and load the application with the data viewed during the prior execution of the application. The hidden file is accessible (e.g., via read/write access) to the single instance of the application during run time. Further, when the application is closed, the hidden file is updated and saved. Thus, the data stored by the application appears to the user as if it were a constant save. However, similar to the file-based model, the application-based model is not intended for use in a collaborative environment. In this regard, only one instance of the application can open or use the data structure/hidden file at any given time. Thus, there is no mechanism for many people or instances of the application to access or write to a single hidden file/data structure.

In view of the above, under the hidden file/application based model, a separate file could be used for every computer/instance of the application for version control. Further, the sequence or set of files could be stored on a central server. However, the prior art fails to provide any ability to utilize/access the information contained within multiple instances of the hidden files. For example, in a spreadsheet or accounting system, the prior art would allow multiple different instances of the accounting system to open up multiple different hidden files stored on a server. However, the prior art would not permit the user to see the end balance for every user of the system (or for the multiple applications). Thus, the prior art fails to provide any application specific data knowledge outside of the application itself. Similarly, the specific effects created by artists in a collaborative scene are not available or accessible in a single application.

In view of the above, prior art applications fail to provide detailed creative/non-creative based information generated by/during use of the application once an application has completed execution. For example, prior art applications may provide naming convention based information (wherein the name of the file is used to derive information) such as the name of a file, the last modified date of a file, the owner of the file, or other information that is user dependent. However, if the naming convention or the actual name of the file is changed by a user, the information is lost or not easily determinable.

An example of the failure to provide application specific knowledge exists with compositing/editing software. Suppose a city is being created with 200 buildings and a superhero flying through the city. An application would create the city with references to all of the buildings. The details and artistic attributes of each building could be farmed out to separate artists. As each artist adds definition, multiple versions of that single building are created/generated. In the prior art, the city is manually managed by people. In this regard, the person has the responsibility to manually track the different versions of each building across all artists. If the wrong version/building is loaded, the result could be costly (e.g., based on the re-rendering of the multiple frames that include the building). The prior art may elect to manage such a city using a particular naming convention. However, as described above, such a naming convention would not provide sufficient information and individual artists could change the name and the manager may not be aware of the change. Thus, prior art facilities have no mechanism for determining/maintaining organization/knowledge of the desired information for a particular shot, sequence, project, or movie.

The city/building example above also illustrates the failure of the prior art to consider that dependencies may frequently change (especially in a collaborative environment). In this regard, references to the buildings may change frequently as people create new versions. In the prior art, a snapshot at a given time is taken and all dependencies (e.g., in a dependency graph as described above) are stored for that snapshot. However, as the information and data changes, the prior art fails to update the references. Thus, while data is maintained for a particular snapshot in time, such a snapshot may not be updated nor accurately reflect information. Accordingly, there is no mechanism for maintaining knowledge of the state of every single element or work in a collaborative environment.

In addition to the snapshot information, non-creative information used in the application is not stored or viewable by the application or outside of the application. For example, the time spent by particular artists, the time spent rendering, the amount of storage space consumed, etc. are not collectable or viewable in the prior art. Instead, only peripheral user-based information such as the date changed is available/accessible. Further, color correction, setup information, information relevant to the creative aspects of the application, cross-dependencies (e.g., on a project basis), and other information are not available nor exposed in the prior art.

The failure to maintain accurate information and the inability to expand in a collaborative environment also present multiple additional issues. For example, scripting applications in the prior art may be utilized to perform various effects on data. However, without error checking and the ability to exclude access to certain users (or to maintain a system for reading/writing files), such prior art scripting applications often override work that an artist has performed. In this regard, the prior art fails to maintain the knowledge of whether a particular artist has a file open or if a certain version is required.

In view of the above, what is needed is a mechanism to effectively and efficiently process, track, maintain, and manage clips and/or elements within clips.

SUMMARY OF THE INVENTION

A relational database management system (RDBMS) is integrated directly with post-production compositing software. Each element that contributes to the rendering pipeline is tracked independently by the RDBMS, which is located on a centralized server. With this integration, the post-production software can report on the state of any particular element of the rendering pipeline. The system maintains a history (i.e., keeps track) of which clips are in process, finished, open and how long each has been worked on. Critical-path clips/tasks can be automatically identified. If multiple variations of a clip have been created, the post-processing software provides an interface for quickly selecting a variation, and previewing the entire rendering sequence using it.

Because a great variety of information is captured by the database, including file-path information, the system allows the post-production software to perform asset-management. For example, the file path information allows digital artists to instantly locate the machine and drive the file the asset is stored on, to substitute one asset for another, and to easily package up a collection of assets to move to another machine. The database also supports searching capabilities and user-defined attributes and can therefore be customized for each particular facility and workflow.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
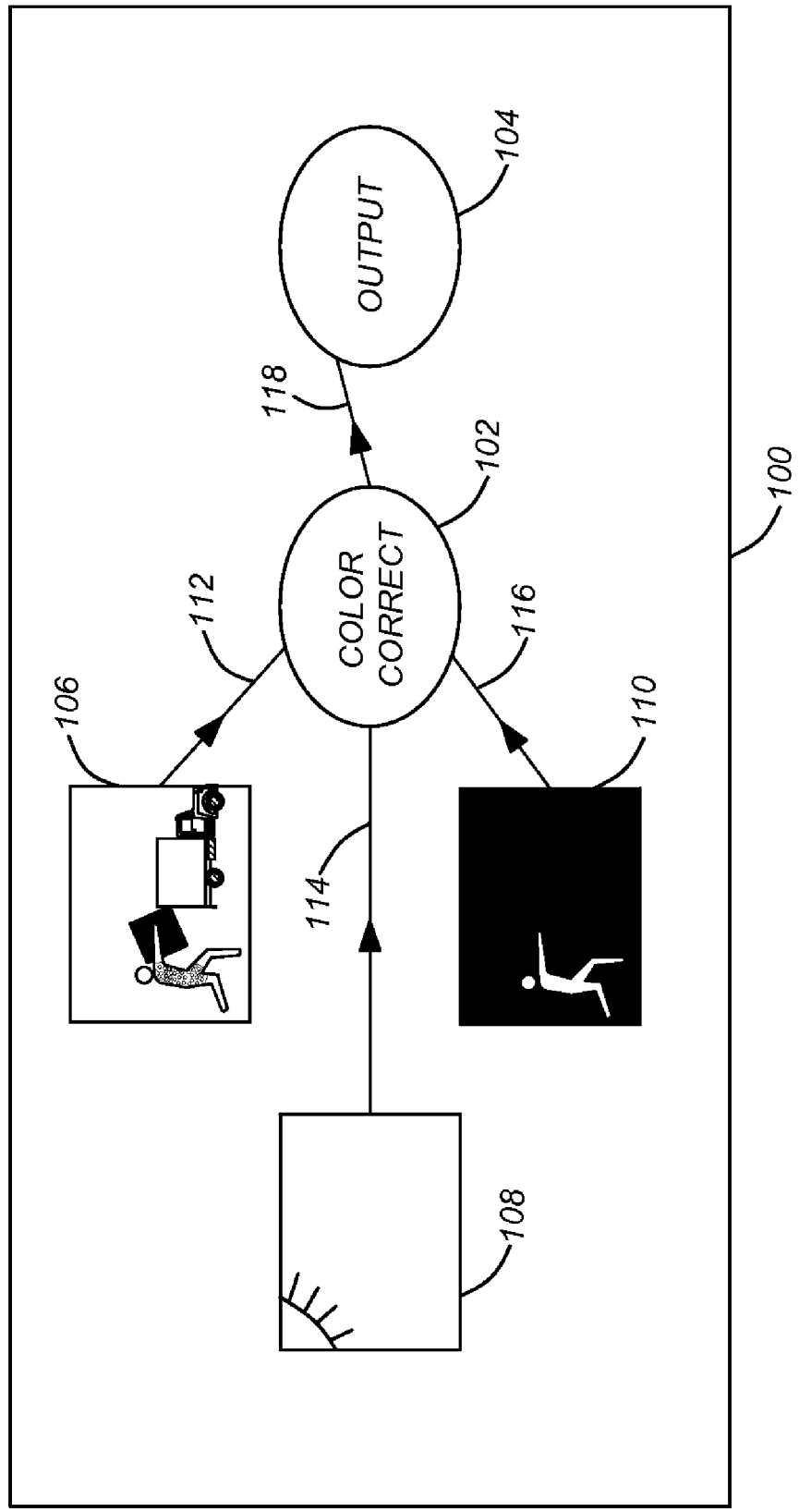
FIG. 1 illustrates a process tree in a schematic view.
Figure 2:
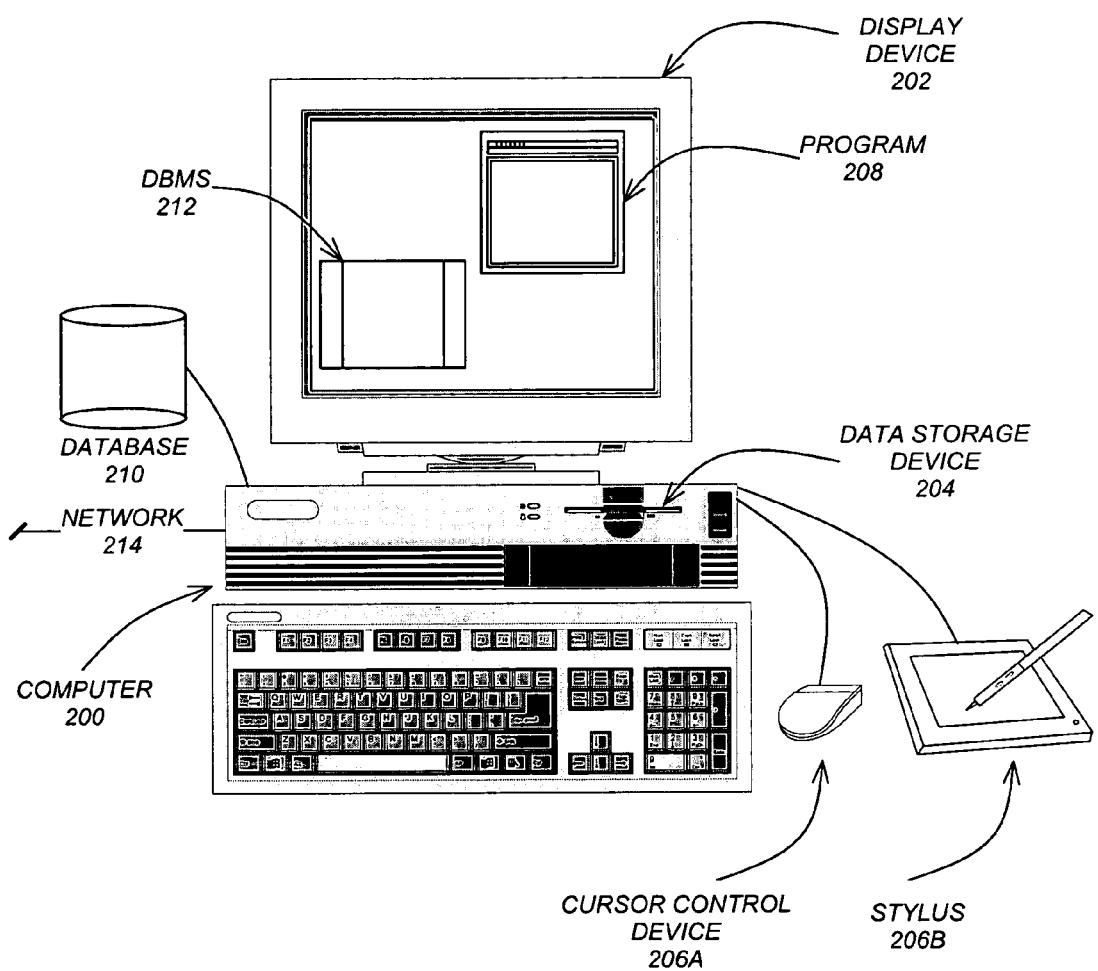
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage device(s) 204, cursor control devices 206A, stylus 206B, database 210, network connection 214, and other devices. Those skilled in the art will recognize that any combination of the above components, or any number of different components, peripherals, and other devices, may be used with the computer 200.

One or more embodiments of the invention are implemented by a computer-implemented program 208. Such a program may be a procedural renderer (i.e., an application that provides the ability to edit operators in a schematic view), a paint application, a media player, a video editing program, an effects program, compositing application, or any type of program that executes on a computer 200. The program 208 may be represented by a window displayed on the display device 202. Generally, the program 208 comprises logic and/or data embodied in or readable from a device, media, carrier, or signal, e.g., one or more fixed and/or removable data storage devices 204 or databases 210 connected directly or indirectly to the computer 200, one or more remote devices coupled to the computer 200 via a data communications device, etc. In addition, program 208 (or other programs described herein) may be an object-oriented program having objects and methods as understood in the art. Further, database 210 may be managed by a database management system (DBMS) 212.

Database 210 may be accessible by program 208 (e.g., through DBMS 212) and may store the program itself or information accessed by such program. Further, such a database 210 may be a relational database wherein a set of separate, related files (tables) are maintained and data elements from the files are combined for queries and reports when required. The database 210 may be managed by a database management system (DBMS) 212 (also referred to as database server) comprised of software 208 that controls the organization, storage, retrieval, security, and integrity of data in the database 210. Such a DBMS 212 or a relational DBMS (RDBMS) accepts requests from program 208 to access the data and instructs the operating system to transfer the appropriate data. One or more embodiments of the invention may utilize an RDBMS 212 available from Oracle™, IBM™, Microsoft™, and/or Sybase™. Further, the database may be distributed database system wherein information is stored in multiple storage units may or may not be geographically diverse and managed by a centralized DBMS 212 via network 214.

In one or more embodiments, multiple computer systems 200 or databases 210 are communicatively coupled via network 214 to establish a collaborative environment.

Figure 3:
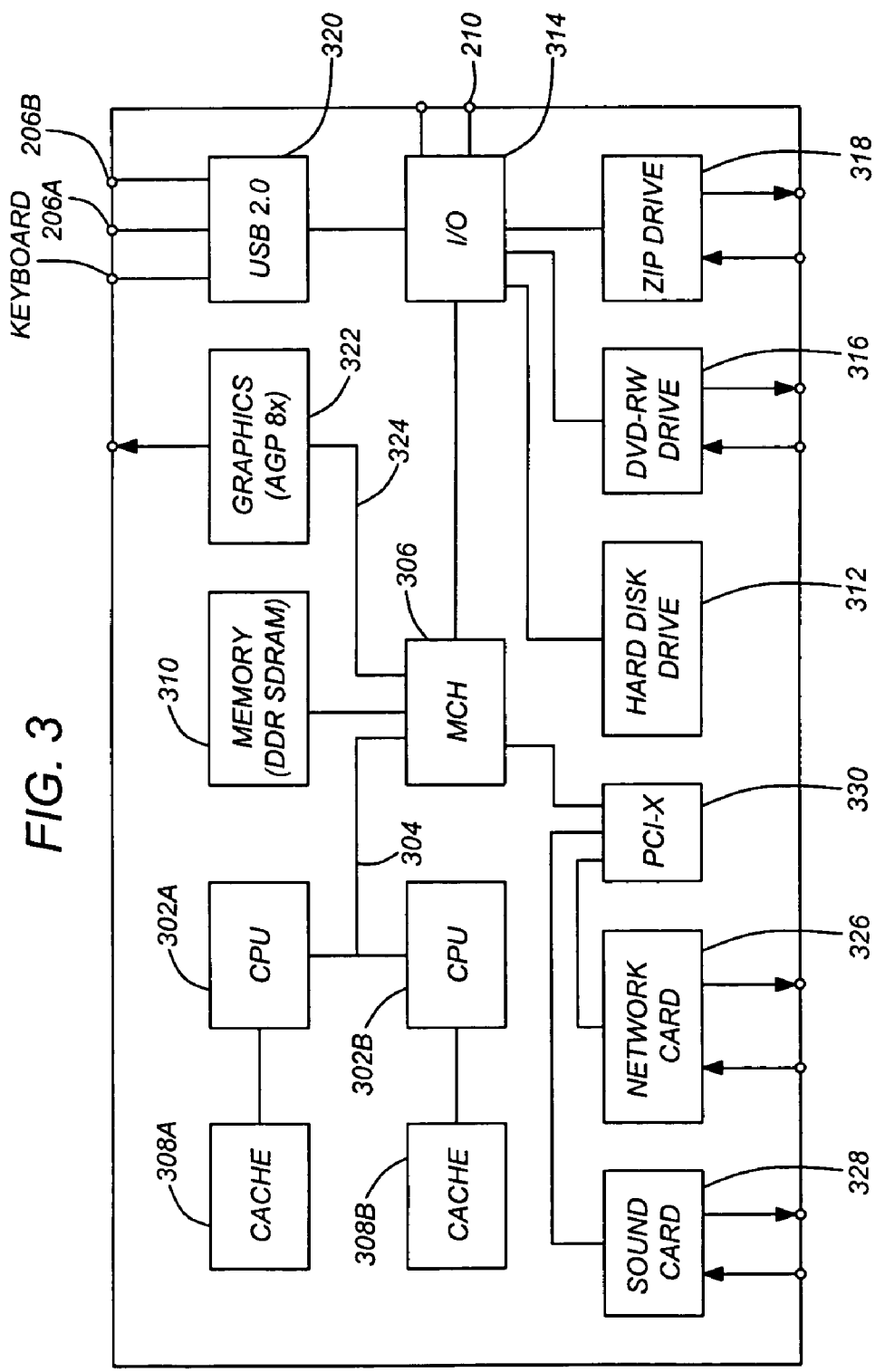
FIG. 3 illustrates details of the components of the computer system of FIG. 2 in accordance with one or more embodiments of the invention.

The components of computer system 200 are further detailed in FIG. 3 and, in the preferred embodiment of the present invention, said components are based upon the Intel® E7505 hub-based chipset.

The system 200 includes two Intel® Pentium™ Xeon™ DP central processing units (CPU) 302A, 302B running at three Gigahertz, that fetch and execute instructions and manipulate data via a system bus 304 providing connectivity with a Memory Controller Hub (MCH) 306. CPUs 302A, 302B are configured with respective high-speed caches 308A, 308B comprising at least five hundred and twelve kilobytes, which store frequently-accessed instructions and data to reduce fetching operations from a larger memory 310 via MCH 306. The MCH 306 thus co-ordinates data flow with a larger, dual-channel double-data rate main memory 310, that is between two and four gigabytes in data storage capacity and stores executable programs which, along with data, are received via said bus 304 from a hard disk drive 312 providing non-volatile bulk storage of instructions and data via an Input/Output Controller Hub (ICH) 314. Hard disk drive 312 may maintain a file system for storing media content. In this regard, the file system on disk drive 312 may be an NTFS file system or FAT file system.

The I/O hub 314 similarly provides connectivity to DVD-ROM read-writer 316 and ZIP™ drive 318, both of which read and write data and instructions from and to removable data storage media. I/O hub 314 provides connectivity to USB 2.0 input/output sockets 320, to which the stylus and tablet 306B combination, keyboard, and mouse 306A are connected, all of which send user input data to system 200. Further, the I/O hub 314 may communicate and provide the ability to access data and information stored on database 210.

A graphics card 322 receives graphics data from CPUs 302A, 302B along with graphics instructions via MCH 306. The graphics card 322 may be coupled to the MCH 306 through a direct port 324, such as the direct-attached advanced graphics port 8X (AGP 8X) promulgated by the Intel® Corporation, the bandwidth of which exceeds the bandwidth of bus 304. The graphics card 322 may also include substantial dedicated graphical processing capabilities, so that the CPUs 302A, 302B are not burdened with computationally intensive tasks for which they are not optimized.

Network card 326 provides connectivity to a framestore or other computers 200 by processing a plurality of communication protocols, for instance a communication protocol suitable to encode and send and/or receive and decode packets of data over a Gigabit-Ethernet local area network. A sound card 328 is provided which receives sound data from the CPUs 302A, 302B along with sound processing instructions, in a manner similar to graphics card 322. The sound card 328 may also include substantial dedicated digital sound processing capabilities, so that the CPUs 302A, 302B are not burdened with computationally intensive tasks for which they are not optimized. Network card 326 and sound card 328 may exchange data with CPUs 302A, 302B over system bus 304 by means of Intel®'s PCI-X controller hub 330 administered by MCH 306.

Those skilled in the art will recognize that the exemplary environment illustrated in FIGS. 2 and 3 are not intended to limit the present invention. Indeed, those skilled in the art will recognize that other alternative environments may be used without departing from the scope of the present invention.

Software Environment

As described above, a software application 208 such as a video effects program, post-production compositing software, or a procedural renderer (that permits the viewing of different operations schematically) may execute on computer 200. In embodiments of the invention, such a software application 208 is directly integrated with a relational database management system 212. Each element that is used by a node 102-106 in a dependency graph 100 is tracked independently by the RDBMS 212 that is cited on a centralized server. With the integration, the post-production software 208 can report on the state of any particular element of the dependency graph 100/rendering pipeline.

Thus, the RDBMS 212 allows a creative application 208 (e.g., a compositing software) to store and retrieve composition data. Data stored in the database 210 is information related to projects and users, including folders, compositions, user-defined attributes, desktops, user and project settings, etc. The database 210 stores all date related to current projects, but does not store image data. Image data is typically read from ordinary image files and cached locally in the mediastore (see detailed description below). In addition to enabling the application 208 to be used collaboratively, the RDBMS 212 relieves the end-user of explicitly having to save data. In this regard, all user actions are saved on a virtually continuous basis.

In view of the above, the RDBMS 212 (through database 210) maintains knowledge of which clips are in-process, finished, open, and how long each has been worked on. Critical-path clips/tasks can be automatically identified. Further, if multiple variations of a clip have been created, the post-processing software 208 provides an interface for quickly selecting a variation, and previewing the entire rendering sequence using the selected variation.

The integration of the DBMS 212 with the software 208 provides the ability to have multiple people work on one or more projects and to have dependencies tracked between people.

Database Structure

As described above, elements and information within nodes 102-106 may be stored in a database 210. In addition, some of the media content (e.g., scene information 106 and 108) may also be stored in a database 210 or on a file system such as NTFS within hard disk drive 312. However, in a collaborative environment, media content may need to be centrally located for access to all collaborators. Accordingly, a central repository (also referred to as a central mediastore) may be used to store media files for media content referenced by one or more compositions. In addition, to expedite the processing and access to the data, it may be desirable to store the media content locally. As described above, metadata for the acts performed by nodes in a composition may be stored in central location/database 210. Such metadata may also be locally cached.

In view of the above, one or more embodiments of the invention support local caching of the referenced media (i.e., image data) and/or metadata. Further, some internally generated media such as intermediate results and thumbnails may also be locally cached. By using a local cache, network traffic may be reduced when the referenced media is stored remotely. It also helps in achieving interactive performance and if properly equipped, the local cache can deliver real time performance.

Embodiments provide for one cache per computer/machine 200 and its content is private to the machine. As used herein, the locally cached media (and metadata) may be in the form of a normal file on the file system (e.g., NTFS) (e.g., on hard disk drive 312) wherein Win32 calls are used to access it. In order to synchronize multiple processes using the cache, a shared arena may be needed.

Local caching may be used to store referenced target streams, proxies, rendered results, intermediate results, and thumbnails. In addition, referenced frames (and/or metadata) may be copied into the local cache on usage (by default). Further, media content (and/or metadata) may be stored in the local cache in various circumstances. For example, a needed media frame or metadata may be cached on demand. In addition, media or metadata may be cached upon request about a composition, (e.g., from a hotkey, browser function, or scripting). Such caching upon request may be performed as a background task. Further, if intermediate results and thumbnails are locally cached, they may be internally generated on demand and not fetched.

The local cache manages itself in an automatic matter. If no more space is available in the local cache, old media/metadata is removed to provide place for the newly accessed media. Further, the evicted material may be automatically chosen using a least recently used (LRU) algorithm (e.g., on a per stream or per chunk basis). The LRU is managed locally or by a central database 210 using a stored procedure (e.g., to emulate trigger on select; select chunkid, mark_accessed (chunkid) from OmMediaChunk).

Metadata Overview

As described above, data relating to a composition including user based information, the attributes and properties of a node, etc. may be collected and stored in metadata. In accordance with embodiments of the invention, metadata is presented to the user via a user interface that interacts with a database 210 that actually contains/stores the metadata.

So that the user can more easily visualize and understand the data, the user interface presents the information in a logical manner. Accordingly, the user interface and application programming interface (that provides an additional mechanism for accessing the metadata) provides the capability to interact and query the metadata stored in underlying tables of a database. The user interface presents the metadata to the user in a familiar form. In this regard, a virtual folder structure may be presented to the user with a root and various folders/subfolders. Within the folders are various setups or dependency graphs (i.e., image processing trees). Accordingly, each setup has various nodes including media nodes (i.e., that refer to image data), image modifier tools (e.g., that perform some sort of image modification such as degraining, compositing, blurring, etc.), and output nodes (that identifies where the result is written to). The folders may also include project information that identifies project-related information such as the director's name, client name, title of project, location, etc.).

All of the metadata presented via the API or UI is stored in the database (e.g., in various tables). The metadata stored in the tables may also be used to recreate a dependency graph if necessary. Accordingly, the metadata provides attribute information relating to the various nodes within a dependency graph.

Application Programming Interface (API) Overview

The API provides the ability to easily access and utilize metadata and image data stored in the database 210. One or more embodiments of the invention utilize an API in the form of scripts that may be used to perform rendering, project setup, media import, database creation and management. Further, such scripts may be written or used in conjunction with programs written in C, C++, PYTHON, or any other programming language. In addition, various buttons of a UI may be associated with or used to launch a particular task or execute a particular script.

As described above, the dependency graph describes a composition. The API provides access to the tools and internals of the composition (as stored in the database 210). The API may be used to create, modify, and delete nodes, make, modify, or remove connections between nodes, create and set dynamic values and set the input values of nodes. In addition, the API provides access to the metadata and published results of a composition.

Thus, a composition has various nodes. Some of the nodes are tools nodes that represent a call to a tool. Other nodes may be used to provide access to the internals of the composition/dependency graph. Nodes have input and output sockets. An input socket can be connected to an output socket of another node, and vice-versa. An output socket may be connected to multiple input sockets. However, an input socket may be configured to accept a connection from only one output socket. Sockets may be identified by a name, a layout, a direction (e.g., input or output), a lifescope (e.g., static or dynamic; a dynamic lifescope means that the socket was added dynamically after the node was created), and a data type that describes the kind of data that flows through the socket when the graph is processed (inputs and outputs of connected sockets may be required to have matching data types).

The layout of a socket may be a single-valued socket (a socket that accepts a single connection, a multi-valued socket (a variable-size vector of sockets of the same data type), or a structured socket (a container of other sockets, where each contained socket has an associated name).

Thus, the API is used to store and retrieve all of the information relating to the various tools/nodes of a dependency graph. The properties of each of the nodes and tool nodes may also be added or retrieved via the API. For example, the name, input, and layout may be created and added, removed, or retrieved for a tool node. Nodes may also be grouped together to provide structure within a graph in the form of a group node. In addition, a value node (a node that feeds a constant or animated value to its output), a boundary node (a node that is used within a group to provide a published input/output to the group node), and/or a link node (a node that connects the output of a published result tool node in another graph into a current graph) may be added, removed, or accessed via the API of the invention.

In addition, as described above, the database components may be accessed as a virtual file system via the API. In this regard, the API may be used to create, remove, modify, or access a database 210 (e.g., via creating, removing, or accessing folders, trees, paths between nodes, attribute information, setups, etc.). In addition, attributes in the database that may be accessed via the API may include information relating to a folder, graph, tool, project, user, machine, and/or setup. For example, the API may be used to search all of the objects (e.g., relating to folders, graphs, tools, projects, etc.) in a database created by a particular person or the time of creation. Alternatively, the projects may be searched for a particular project ID. In this regard, the API or standard SQL (or other query language) may be used to add, remove, modify, or access information relating to media content and metadata stored in the database 210.

Similarly, the API may be used to create a user interface that facilitates interaction between the user and the database. For example, the API may be used to create a dialog box with a series of buttons that are linked to other API calls/scripts to perform a variety of desired actions.

Database Table Embodiments

Figure 4:
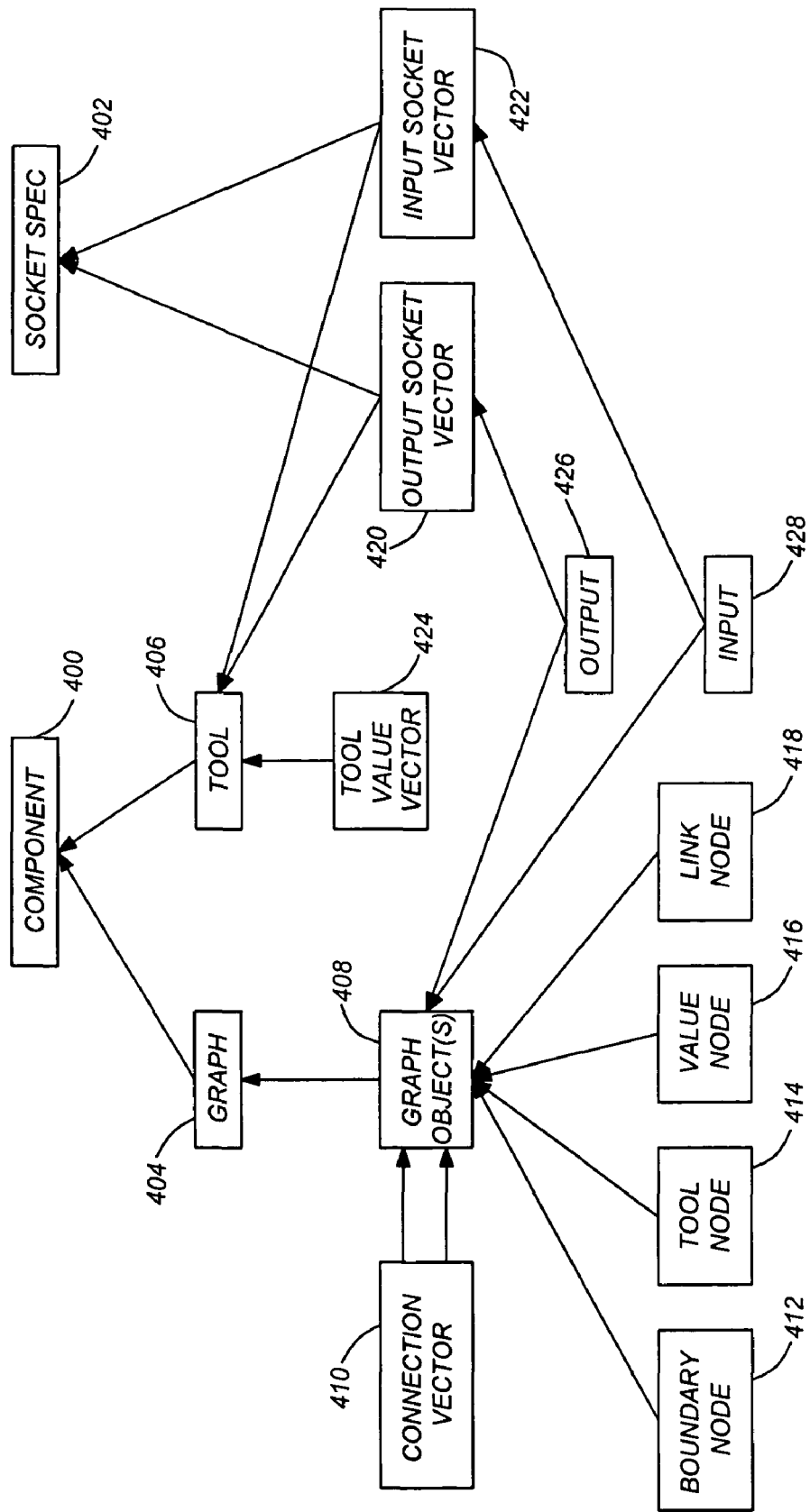
FIG. 4 illustrates examples of various tables that may be used to store metadata in accordance with one or more embodiments of the invention.

FIG. 4 illustrates examples of various tables that may be used to store metadata in accordance with one or more embodiments of the invention. There are two primary tables that all of the other tables refer to—component table 400 and socket spec table 402. The component table 400 is referenced by a graph table 404 and tool table 406. Accordingly, the graph table contains a listing of the various dependency graphs for the network. The graph table 404 is referred to by one or more graphic object(s) that are identified in a graph object table 408. Connection vectors 410 are used to connect various graph objects and are listed in a connection vector table 410. Each graph object identified in graph object table 408 may be referred to by various nodes listed in a series of tables including a boundary node table 412, tool node 414, value node 416, and/or link node 418. The various nodes 412-418 make up the various nodes of the dependency graph.

In addition, the socket spec table 402 may be referenced by an output socket vector table 420 and input socket vector table 422, both of which may reference a tool identified in tool table 406. These output and input socket vectors identify the sockets as described above. An additional table may include a tool value vector table 424 that refers to tools in tool table 406. Such tool value vectors may simply contain an identification and name for a tool in tool table 406. Output table 426 and input table 428 further define the output from a graph object 408 based on an output socket vector 420 and the input to a graph object 408 based on input socket vector 422.

Thus, as illustrated in FIG. 4, various tables may be used to coordinate, organize, and store the various features and attributes of a dependency graph. These tables may be directly accessed via SQL queries. Alternatively, as described above, an API may be used to present the information in a more understandable and user friendly manner.

Collaboration

In a collaborative environment, various rules or access restrictions for a database that is being accessed my multiple users should be enforced. In the collaborative environment, the media (e.g., image data) and metadata (i.e., data relating to actions performed by the user and information relating to the media) are shared among all of the users. When someone creates a new element, everybody in the system is able to see it. In one or more embodiments of the invention, first come-first served is the basic logic. In this regard, the first user to edit an element is the only writer. The other users can only see a consistent read-only snapshot until the writer stops writing.

A few basic facts about a collaborative environment are useful: All users can simultaneously log into the environment. All users can read any elements desired in the system. Users may collaborate among themselves and with the remote background tasks. Only one user may be permitted to modify a given element at a time. However, it is possible to get a consistent snapshot of a currently edited element. Lastly, users can manually lock elements.

In a collaborative environment, the present invention provides the ability to perform various operations. For example, the system provides the ability to preview a composition while it is being rendered. Further, a composition may also be previewed while another user is working/viewing the composition. In addition, a composition may be generated/regenerated based on the metadata alone.

Embodiments provide the ability to utilize a snapshot mode that consists of a protocol that solves the reader-writer problem in a first come first served collaborative environment. A feature of the snapshot mode provides that readers never wait for the writer to complete its writing operation. However, writers will wait among themselves. A snapshot is a consistent transient copy of a database object stored in the local database cache of an application 208.

At first, any user can browse or issue any read-only operation on library elements, thus the user is are working with up-to-date snapshots. As long as read-only operations are performed on a given element, every user has an up-to-date snapshot in their database cache. At this point, a write operation is available to any user.

When a user commences modifying an up-to-date snapshot, then all other snapshots become out-of-date and cannot become writable. However, the out-of-date snapshot can be updated, in order to get the latest modifications from the writer. Asking for a refresh on an out-of-date snapshot results in an up-to-date snapshot that can be modified. For example, assume users A and B are browsing in the same folder. The folder's elements are stored in the user's database cache as up-to-date snapshots. User A modifies an element (e.g., via a rename operation), and causes user B's snapshot to become out-of-date. To be able to perform some modifications, the user B needs to first update it's snapshot subsequent to which user B can perform write operations.

Compositions may be linked together through rendered results. Further, once published, the rendered results are read-only wherein a composition can be edited while other compositions that refer to it can also be edited at the same time.

Database Lock

A database lock is a mechanism that prevents the other users from becoming a writer on a given snapshot (and/or data stored in a database). Only one database lock can be taken on a given snapshot. A database lock can also only be obtained on an up-to-date snapshot. For example, if user A obtains a database lock on a given snapshot, all of the other users cannot write to their snapshot, even though is it up-to-date. If user A has a database lock on a given snapshot, no other user is allowed to obtain a database lock on it.

The purpose of the database lock is to allow a user to obtain exclusive write access to an element. By preventing external write access, the owner of the database lock is guaranteed that the owner's database-locked snapshot will always be up-to-date and thus interactivity on the database side will never be compromised. Accordingly, a database lock is used when the user needs to work on a given snapshot for an extended period of time.

Snapshot Mode Embodiments

The snapshot mode is applied only to compositions, which may be the only object type that can be edited for an extended period of time.

Opening a composition means trying to obtain the exclusivity on it. The exclusivity, or read write access, is achieved when a database lock is successfully acquired on a given composition. As described above, only one user can have a database lock on a composition at a given time. If a database lock cannot be acquired, then the composition is opened in read-only mode as a snapshot. A user who failed to obtain the exclusivity on a composition can refresh it's snapshot. Refreshing a 'failed' opened composition will update the snapshot and try to obtain a database lock on it again. Updating a composition means loading the last coherent version of the composition out of the database in order to obtain the latest updates.

The user opens a composition by double clicking on it (e.g., using a cursor control device 206A or stylus 206B) or by performing a file—open selection in taskbar. Once opened, the user may view a composition. Such a viewing operation encompasses viewing a read-only snapshot of a composition at the time of the request. The read-only view of the composition may be refreshed to obtain the latest version of the composition. Such a read-only view operation may not be capable of failing. A read-only composition is useful for consultation of a toolnode settings or copy/paste purposes. The user obtains a read-only view of a composition by performing a file—view operation/selection (e.g., in a taskbar).

When a composition is closed, the transient copy of the composition is deleted. If a database lock was acquired, the lock is then released. When a snapshot is closed there is not way to restore the snapshot because there is no persistent storage for the snapshot (unless the user made either a copy or an archive of it). However, the composition can be reopened again from the content of the database (see description above/below). The user closes a composition by performing a file—close operation/selection in a taskbar. Note that when quitting an application 208, all of the opened compositions may be closed.

Embodiments of the invention include a creative workspace that supports having multiple compositions in the workspace simultaneously. The status of a given composition is independent of the others. One can have as many open compositions in view mode and read-write as desired.

Figure 5:
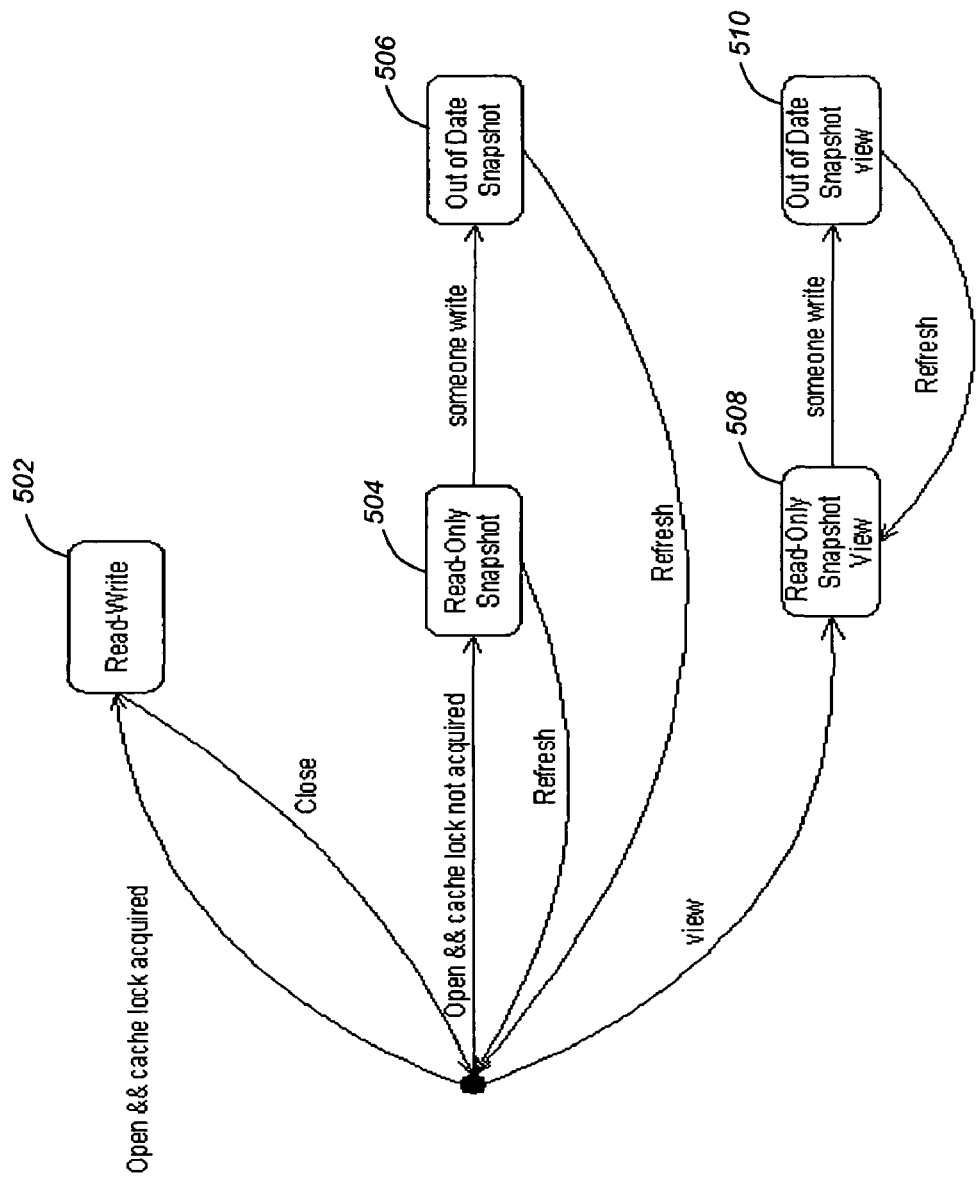
FIG. 5 illustrates a state diagram of a composition inside a creative workspace as seen by the user in accordance with one or more embodiments of the invention.

FIG. 5 illustrates a state diagram of a composition inside a creative workspace as seen by the user in accordance with one or more embodiments of the invention. Various states 502-510 of the composition are illustrated. In the read-write state 502, the user has exclusivity on the composition. Accordingly, the user has opened the composition and acquired a cache lock in the read-write state 502. If the composition is opened but the cache lock is not acquired, the user enters the read-only snapshot state 504. Thus, the user has a read only snapshot of the composition that is still in sync with the database. If another user performs a write operation or modifies the snapshot, the user enters the out of date snapshot state 506 in which the user has a read only snapshot of the composition that is no longer in sync with the database. In both read-only snapshot state 504 and out of date snapshot state 506, the snapshot may be refreshed that starts the user back at the beginning with the option to obtain a lock or not.

The user may also explicitly ask for a read only snapshot of a composition thereby placing the user into read-only snapshot view state 508. In state 508, the composition is still in synch with the database. However, if someone performs a write operation or modifies the snapshot, the user enters out of date snapshot view 410 wherein the composition is no longer in sync with the database. By refreshing the out of date snapshot view, the user's view again becomes synchronised with the database placing the user back in state 408.

The user's desktop (e.g., within application 208) allows users to perform write operations on compositions. An attempt to obtain a database lock is done before performing each write operation and released once a write operation is completed. If a database lock cannot be obtained, then the write operation will fail.

A workspace (also referred to as library workspace) within application 208 displays the states illustrated in FIG. 5 for each composition displayed. Folders within the library may not follow the snapshot mode. Instead, the folders may be refreshed automatically each time a user is writing to it.

An additional workspace (e.g., a system workspace) may be used to enforce a policy wherein only one user at a time can have write access to a given user or project at a time. The first user accessing a given user or project will gain the exclusivity using a database lock. The users that don't succeed in obtaining a database lock will see the user or project as read-only (e.g., in state 504 or 508).

In one or more embodiments, when the compositing being viewed is out of date (i.e., in state 506 or 510), a visual representation that indicates the user is viewing an out-of date snapshot may be displayed. Such a visual representation may take the form of an icon the reflects a current state. Alternatively, a tool within the user interface may be grayed-out (dimmed), and the icon for a composition in taskbar may indicate the lock state of the composition. Further, the user may be required to explicitly ask/request an update of the snapshot (e.g., via refresh command). In addition, out-of-date snapshots may not be persistently stored. In this regard, when a user quits the application or closes a snapshot, the next time the user logs in or re-accesses the composition, the snapshot will be reloaded using updated data leading to an up-to-date snapshot.

User may also have the option to manually set a read-only flag on a composition (read-only for everybody). Such a set/clear mechanism is available to any user and a different user can clear the read-only flag. The flag is persistent and contains a description, providing the reason why the composition was set to read-only. The flag can be set/cleared from the browser's information panel at the bottom of the screen and applied to the currently selected composition.

Collaboration Details

To implement/manage the database lock and to manage synchronization, one or more embodiments of the invention utilize a permit server (e.g., within computer 200). The permit server coordinates access to the database 210 (e.g., similar to an DBMS 212) and ensures that data kept locally in each application's object cache remains coherent. For example, the permit server ensures that if one workstation/computer 200 opens a composition in read/write mode, any other workstations will have just read-only access to it. In a collaborative environment, the permit server only needs to be installed once, on one machine 200, typically, on the same machine 200 running the database server 212.

The permit server is the central point of synchronization between all of the applications 208 in a collaborative environment. When an application 208 opens a database 210 (that is being managed or appears as a cache to the user), a connection to the permit server is established. Each access to a database's managed object will be reported to the permit server. The consistency schema is of the reader-writer type. In this regard, multiple readers can read the same object at once. However, to modify (write to the database), one must first acquire an exclusive permit that requests all the readers to stop reading. The permit server also supports the locking of a database object that guarantees the lock owner of the exclusivity of write access.

Each database managed object has its own entry in the permit server. The permit server performs concurrency control over the database object access, each entry maintaining two lists of clients. One list is of the owners and the permit that each owner has on the entry. The second list is a list of those waiting for access and the permit that each waiter has requested on the entry. In addition, the database object entry maintains an identification of the owner of the lock on the entry (if one exists). The permit server may issue either an exclusive permit (only one owner can have such a permit at any given time) or a shared permit (in which multiple owners can have shared permits at any given time). When an entry is locked, only the owner of the lock can write (e.g., acquire an exclusive permit) on the associated object.

Clients/applications 208 send permit requests to the permit server via messages across network 214. Client message may include a request for a shared permit (when the client wants to read), an exclusive permit (when the client wants to write), a permit downgrade (when the client acknowledges that it has downgraded its permit from exclusive to shared), a permit release (when the client acknowledges that it has released its permit), a lock permit (when the client wants to lock an object, and lock release (when the client wants to release a lock). The permit server may respond and send the appropriate (or lesser) permit back to the clients as required. Such responses may include a shared permit, an exclusive permit, a revoke permit (when the permit is revoked), a downgrade permit (when a permit has been downgraded to a shared permit), lock acquired (when a lock on an object has been granted), lock in use (when a lock is denied), and reference locked (when a write permit is denied because the entry is locked).

A cache catalog may also be used that maintains cache entries that contain transient copies of database objects. The cache catalog contains the state machine that performs the proper state transition according to internal and external requests. An internal request results from an action performed by the user of the application 208. An external request results from an action performed by another user and is sent by the permit server. Thus, internal requests are actions that are performed by the local application 208 that results in a direct transition in the state machine. As described above, such internal requests may include a lock request, refresh request, read access request, or write access request. However, external requests come from the permit server in response to another user's request.

As described above, an application programming interface (API) user may also attempt to lock an entry. If the user succeeds, a transition occurs. In addition, the API user can refresh an out of date snapshot to obtain the latest version of the entry from the database 210. After such an update operation, the entry may transition to the READ state. The user can also ask to read an entry (an operation that may never fail). Further, a user may ask to write to an entry. Write access can be denied if somebody else has a lock on the entry. Otherwise, the write access will be granted.

As described above, external requests to the cache catalog come from the permit server in response to another user's request.

As described above, the current state of data may exist in a variety of forms. Three (3) variables establish the current state: the permit, the lock status and the snapshot policy.

The permit represents the permit acquired with the permit server. Possible values include PERMIT_NONE, PERMIT_SHARED, and PERMIT_EXCLUSIVE.

The lock status determines whether or not the lock has been acquired from the permit server. Possible values may include LOCKED and NONE.

The snapshot policy determines if the data is permitted to get out of date if somebody else modifies/writes to that entry. If out-of-date is allowed, the pointer will be kept in memory; otherwise it will be flushed. Possible values may include NO_OUT_OF_DATE and ALLOW_OUT_OF_DATE. By default, all the entries are NO_OUT_OF_DATE to make sure the user is always working with an up to date version.

Cache Overview

In view of the above, it may be understood that both media content (i.e., image data) and metadata relating to a composition may be stored in a centralized database. Further, both media content and metadata may be locally cached in accordance with the collaboration and locking mechanisms described above. Accordingly, in the case of metadata, a local copy of the metadata is stored. When opened, a particular user state is entered depending on the lock obtained by the user. For example, when a user opens a setup that is reflected via various entities in one or more tables, the series of relevant tables may be locked such that nobody else has write access to the open tables (e.g., the user has a read-write lock). When the setup is closed, all of the related tables will become available to the user.

With either the media content or metadata, the data may be updated back to the centralized database in a lazy manner. For example, a write command may be placed into a queue that is used depending on the processing needed, network, availability, etc. Such a write operation may be executed whenever a user closes data being accessed in the cache, when another user requests a lock, or other such operation.

Cache Catalog API

Various API may be used to export the functionalities described above. For example, a refresh API may be used to update the transient copy of a database object. Such a refresh API command affects the current state of the entry only if the transient pointer is an out of date snapshot. Further, in order to refresh an object, one simply needs to unload and then reload the object. A locking API command is a low level locking interface that returns a lock object that is automatically released on destruction (i.e., of the object). Further, a state API command may be used to export the state of cache entries (e.g., locked or out of date).

File Import/Output

File importation is an operation by which the user can associate a piece of external media (e.g., image data or media content) with some data kept in the database. In this regard, a file import preview allows the user to apply a tool pipeline (e.g., the various tools in a dependency graph) on an import stream (e.g., operations such as LUT, crop, resize, etc.). The import results in a media node in the composition.

As described above, intermediate results may be generated in the local cache and not written back to the centralized database 210. Accordingly, users on another machine may not have access to and cannot use such intermediate results.

File export occurs when the user renders a composition by creating either a rendered result or a final result. With either a rendered result or a final result, the export results in a sequence of file(s) written outside of the media cache (e.g., in the centralized database 210).

Compositions/dependency graphs within application 208 may need to be exported for archiving. In this regard, the composition may be stored in the file system in a structured manner along with the media files/image content.

As described above, the database 210 may be used in various manners. The database may be used as a centralized storage mechanism for the media content and metadata as described above. In addition, the database may be used as a local cache that is not exposed in a browser (i.e., to users on network 214). When used as a local cache, the user may create and manage compositions using a file system browser (e.g., Windows™ Explorer™. The composition file would contain an XML description that may be updated either automatically on certain events (e.g., when the user quits the application 208 or closes the schematic/dependency graph) or on user demand. The database acts like the media cache (as described above) while storing temporary data. When the user loads a composition, the system may check if a copy is already available in the database in the version described in the file (e.g., determine whether a cache hit has occurred).

With the database cache not exposed to the user, scripting (e.g., using the API described above) can abstract the fact that there is a database. In this regard, scripts that may not discarded can be written without any chance of polluting the library with excessive compositions. Further, the management of the media and data is performed on the file system only, that is consistent.

Even though the database maybe used as a local cache, the user may manage such a database cache in a library browser. In this regard, a library browser's contextual menu may be used to export the composition (e.g., to a name and path defined by a project setting).

A library (for managing the database cache) may be seen as an extended file system (i.e., a file system with extra or additional capabilities). Hard links, UDA (universal data access) and specialized queries are features that may be available in such an extended file system that are not available in an NTFS system. With the library approach, the desktop and collaborative work may achieve be fully utilized. However, the difficulty of scripting and library management may increase. In this regard, the user may be required to manage two separate hierarchies—the file system and the library. Each time the user desires to execute a script, the database must be opened and closed. Such execution requirements may be excessive and consume resources if the user has numerous scripts that merely result in external media files with internal compositions that are discarded. In addition, such the names of the intermediate compositions may clash since the library is shared among all users.

Presentation of Data

Using the database 210, a user may have the capability to view data collected across multiple collaborative users. As described above, the API may be used in conjunction with a user interface to present the metadata from the database 210 in a visually appeasing manner. For example, the user may elect to view the data arranged in a report, a pi-chart/graph, histogram, or other mechanism capable of displaying data on an aggregate basis. For example, using a pi-chart, the user can view data relating to projects, setups, users, etc. on a percentage basis across multiple users.

Under any method of presenting the data, the user may need to specify the open mode when opening or displaying the report. The open mode specifies the type of access the user desires for a given report. For example, if a user desires read-write access, the user must anticipate a rejection of the requested lock (e.g., if another user already has such access/lock). In this regard, as described above, a read-write access always implies that a database lock was successfully acquired. However, it is possible that the access mode requested cannot be granted if another user already owns the lock. In an open mode, the user may request read-only access or read-write access.

The number of users currently accessing a report or chart that needs access to multiple tables within database 210 may be stored. Accordingly, when closing a report and the open count goes to zero, if the snapshot is up to date, the report may remain in database cache. Otherwise (e.g., if the snapshot is out-of-date), the database cache containing the report may be flushed (or updated/refreshed).

For performance reasons, it may not be allowed to unload a report (i.e., from cache) while it is opened. Thus, if someone desires write access, the database cache may always go into an out-of-date snapshot state indicating the need to flush or update/refresh once the report is closed.

Refreshing an out-of-date report may be different from refreshing a database object. In some situations, a lock may be needed. Accordingly, when a refresh operation is desired, the application 208 may attempt to acquire a lock.

Similar to accessing data and metadata as described above, the display of a report may need similar collaboration controls (e.g., since the report may be accessed/viewed by multiple collaborating users). Thus, the user state is often retrieved. Such user states may include the following:

| User State | Description |
| --- | --- |
| Read-Write | Lock + RW |
| Read-Only snapshot | !Lock + RW + !Out of Date |
| Out of Sate snapshot | !Lock + RW + Out of Date |
| Read-Only snapshot view | R + !Out of Date |
| Out of Date snapshot view | R + Out of Date |

In view of the above, once the desired lock is obtained, the data may be viewed in a user-selected/designated report. Further, multiple users can view/read the same report simultaneously in the collaborative environment.

Logical Flow

As described above, embodiments of the invention allow multiple users to work on projects and to have dependencies tracked between such users. To track such dependencies in a collaborative environment, a database model is utilized with a centralized database containing tables for storing both image content and metadata relating to nodes in a dependency graph. For example, entities may be created in the database (e.g., a database object) for an artist. Such entities may include setups, projects, users, etc. that relate to a series of rows and columns in database tables.

Since a database model is utilized, standard database queries may be performed (e.g., via SQL) or the database may be accessed using an application programming interface (API). Such API may be used to access and present the data in a user understandable metaphor. For example, the user may be presented with project structures having folders and setups. To create, access, modify, or remove such project structures, folders, and setups (or the entities of a database when using SQL) the database grants various types of locks to the user(s) for rows/columns in the database tables that contain the relevant entities. However, the invention manages the database and access to the database transparently to the user such that user may not be aware of the existence of the underlying database. Instead, the user(s) merely view the data in a form the user is accustomed to.

Further, as artists work on a particular application (or part of an application), the data generated by the artists are placed into the database (e.g., transparently to the users). In this regard, changes made by an artist (e.g., edits to a dependency graph) may be stored locally and updated to the central database using a background thread. The storage of data in such a centralized database avoids conflicts and out-of-date dependencies. In addition, the use of such a centralized database avoids automation processes that could potentially overwrite or disregard data created by artists.

As indicated above, the centralized database provides a method for storing information relating to a dependency graph for a user. Such a database may store the information in various tables.

Figure 6:
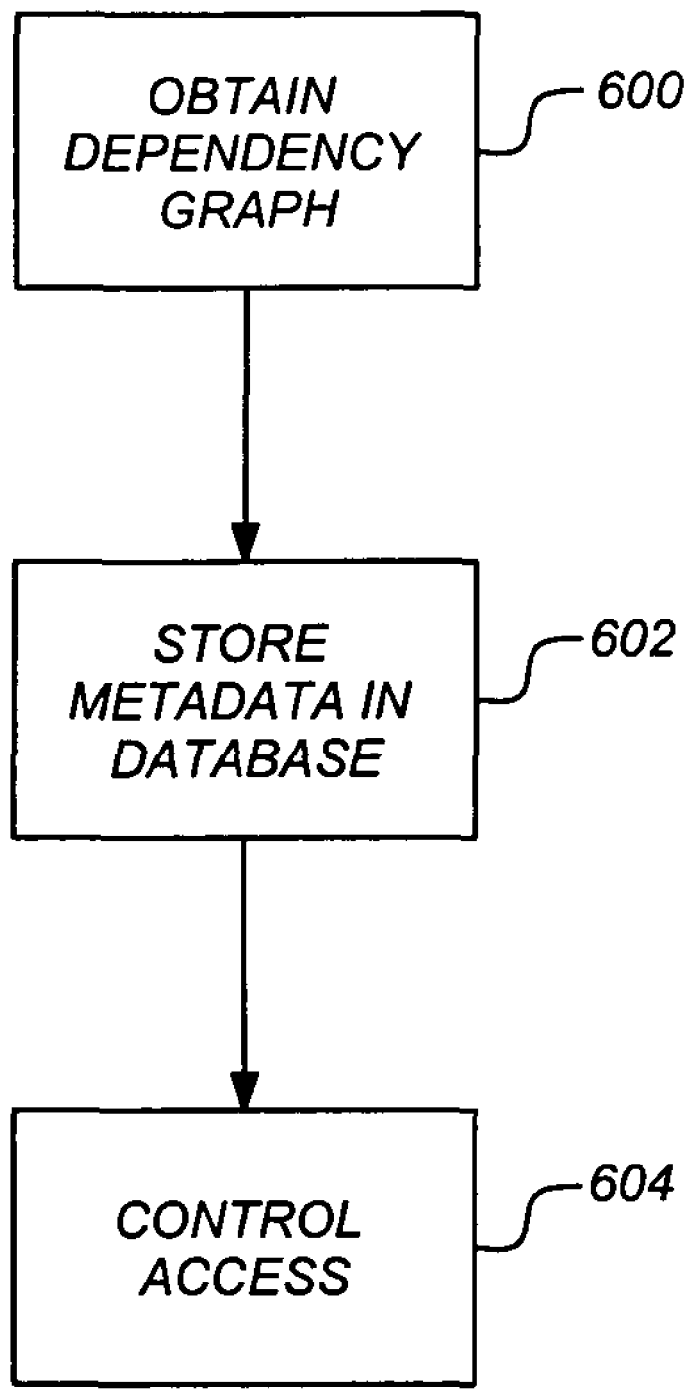
FIG. 6 is a flow chart illustrating the logical flow for performing a method for tracking the processing of image data in accordance with one or more embodiments of the invention.

FIG. 6 is a flow chart illustrating the logical flow for performing a method for tracking the processing of image data in accordance with one or more embodiments of the invention. At step 600, a dependency graph is obtained. Such a dependency graph is representative of a composition—e.g., the image processing performed on media content to generate an output or output clip. Such image processing may also be referred to as image rendering.

At step 602, metadata for each element of the dependency graph is stored in a database (i.e., a centralized database), wherein the database is accessible across a network to multiple users. Such metadata may include data relating to a node of the dependency graph, or data relating to a connection between two or more nodes of the dependency graph. By storing such metadata, the different modifications to the image data performed by multiple users may be tracked in an easy and efficient manner.

At step 604, access to the database is controlled to allow the multiple users to access the dependency graph via the database simultaneously. Such simultaneous access provides the ability for multiple users to access and work on a composition in a collaborative environment. In this regard, the database is updated with updated metadata upon/when one of the users on the network modifies an element of the dependency graph. The control over access to the data may utilize various database access locks such as a read-write access that is granted exclusively to one user or multiple read-only access locks that may be granted to multiple users. Such database locks may be granted to a single element in a database such as a particular row(s)/column(s) of a table, or on a table-wide basis.

In addition, the database may be accessed by one or more of the users via an application programming interface (API). Such an API presents an intuitive familiar presentation of the data to the user/artist.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, distributed database, or standalone personal computer, could be used with the present invention.

Embodiments of the invention provide the ability for multiple users to work on projects wherein dependencies are tracked between people. The database stores entities for the artist relating to setups, projects, and users. The various states of access to particular elements of a dependency graph are tracked and updated across all users on the network. Accordingly, the database may be used to easily check on the status of a particular image processing node/tool, who is responsible for the node, and where the data is located (e.g., which network resource [i.e., hard drive, cache, etc.]). A native API is used to access elements within the database.

An exemplary use of such data arises when multiple artists are assigned to work on various elements of a dependency graph. Each artist may repeat a particular task on an individual element multiple times in different ways and different variations to produce different results. All of the different methods and results may be recorded and tracked in the database. Such different methodologies may be recorded in the form of metadata for elements of the dependency graph. Such recording of metadata may be in pseudo-real time. For example, the modifications to an element may be stored in local cache and updated in the background to the centralized database. The metadata can then be used to reproduce the dependency graph or end result as desired (by any user). Thus, any of the other users across the network have the capability to view the different methods and results of a particular artist based on the metadata stored in the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for tracking a processing of image data in a collaborative environment comprising:
   (a) obtaining a dependency graph comprising two or more nodes, wherein:
      (i) the two or more nodes comprise at least one source node for at least one input source clip of a sequence of images and at least one operator node for performing an operation on the at least one source node to produce at least one output clip;
      (ii) the dependency graph represents dependencies and processing performed on media content to produce the at least one output clip; and
      (iii) the dependency graph comprises a schematic view of a process tree, wherein an output clip of a source node and an operator node is the source for a subsequent node of the two or more nodes;
   (b) storing metadata for each node of the dependency graph in a relational database, wherein:
      (i) the relational database is accessible across a network to multiple users; and
      (ii) each node of the dependency graph is independently tracked by the relational database; and
   (c) utilizing the relational database to:
      (i) provide a collaborated controlled access, to the dependency graph, between two or more users;
      (ii) track a state of processing completion of each of the two or more nodes across the two or more collaborating users including tracking a state of processing completion of an operation on the at least one input source clip and tracking the identity of a user who is responsible for completing the operation on the at least one input source clip, wherein the state of processing completion and identity of the user are made available to all users participating in the collaborative environment;
      (iii) automatically and dynamically maintain and update links between at least two of the two or more nodes when any one of the nodes attached to said links has been modified.

2. The method of claim 1, further comprising continually and automatically, without additional user input, updating the relational database with updated metadata upon one of the multiple users modifying one of the two or more nodes of the dependency graph.

3. The method of claim 1, wherein said metadata comprises data relating to one of the two or more nodes of the dependency graph.

4. The method of claim 1, wherein said metadata comprises data relating to a connection between two or more nodes of the dependency graph.

5. The method of claim 1, wherein said controlling access comprises granting a single read-write access lock for one of the two or more nodes to one of the multiple users on the network.

6. The method of claim 1, wherein said controlling access comprises granting multiple read-only access locks to more than one of the multiple users on the network.

7. The method of claim 1, further comprising utilizing an application programming interface (API) to access the relational database, selecting a variation of one or more nodes of the dependency graph, and previewing a rendering sequence using the selected variation.

8. A computer implemented system for tracking a processing of image data in a collaborative environment comprising:
   (a) a computer having a memory, wherein said computer is communicatively coupled across a network to one or more additional computers to form a network;
   (b) a processing application executing on the computer, wherein the processing application is configured to:
      (i) obtain a dependency graph comprising one or more nodes, wherein:
         (1) the two or more nodes comprise at least one source node for at least one input source clip of a sequence of images and at least one operator node for performing an operation on the at least one source node to produce at least one output clip;
         (2) the dependency graph represents dependencies and processing performed on media content to produce the at least one output clip; and
         (3) the dependency graph comprises a schematic view of a process tree, wherein an output clip of a source node and an operator node is a source for a subsequent node of the two or more nodes;
      (ii) store metadata for each node of the dependency graph in a relational database, wherein:
         (1) the relational database is accessible across the network to the one or more additional computers; and
         (2) each node of the dependency graph is independently tracked by the relational database; and
      (iii) utilize the relational database to:
         (1) provide a collaborated controlled access, to the dependency graph, between two or more users;
         (2) track a state of processing completion of each of the two or more nodes across the two or more collaborating users including tracking a state of processing completion of an operation on the at least one input source clip and tracking the identity of a user who is responsible for completing the operation on the at least one input source clip, wherein the state of processing completion and identity of the user are made available to all users participating in the collaborative environment; and (3) automatically and dynamically maintain and update links between at least two of the two or more nodes when any one of the nodes attached to said links has been modified.

9. The system of claim 8, wherein the processing application is further configured to continually and automatically, without additional user input, update the relational database with updated metadata upon one of the additional computers modifying one of the two or more nodes of the dependency graph.

10. The system of claim 8, wherein said metadata comprises data relating to one of the two or more nodes of the dependency graph.

11. The system of claim 8, wherein said metadata comprises data relating to a connection between two or more nodes of the dependency graph.

12. The system of claim 8, wherein said processing application is configured to control access by granting a single read-write access lock for one of the two or more nodes to one of the additional computers on the network.

13. The system of claim 8, wherein said processing application is configured to control access by granting multiple read-only access locks to more than one of the additional computers on the network.

14. The system of claim 8, wherein the processing application is further configured to utilize an application programming interface (API) to access the relational database, selecting a variation of one of the two or more nodes of the dependency graph, and previewing a rendering sequence using the selected variation.

15. A program storage device, readable by a computer, tangibly embodying at least one program of instructions executable by the computer to perform a method of tracking a processing of image data in a collaborative environment, the method comprising the steps of:

(a) obtaining a dependency graph comprising two or more nodes, wherein:
(i) the two or more nodes comprise at least one source node for at least one input source clip of a sequence of images and at least one operator node for performing an operation on the at least one source node to produce at least one output clip;
(ii) the dependency graph represents dependencies and processing performed on media content to produce the at least one output clip; and
(iii) the dependency graph comprises a schematic view of a process tree, wherein an output clip of a source node and an operator node is a source for a subsequent node of the two or more nodes;

(b) storing metadata for each node of the dependency graph in a relational database, wherein:

(i) the relational database is accessible across a network to multiple users; and
(ii) each node of the dependency graph is independently tracked by the relational database; and (c) utilizing the relational database to:
provide a collaborated controlled access, to the dependency graph, between two or more users;
(ii) track a state of processing completion of each of the two or more nodes across the two or more collaborating users including tracking a state of processing completion of an operation on the at least one input source clip and tracking the identity of a user who is responsible for completing the operation on the at least one input source clip, wherein the state of processing completion and identity of the user are made available to all users participating in the collaborative environment; and
(iii) automatically and dynamically maintain and update links between at least two of the two or more nodes when any one of the nodes attached to said links has been modified.

16. The program storage device of claim 15, wherein the method further comprises continually and automatically, without additional user input, updating the relational database with updated metadata upon one of the multiple users modifying one of the two or more nodes of the dependency graph.

17. The program storage device of claim 15, wherein said metadata comprises data relating to one of the two or more nodes of the dependency graph.

18. The program storage device of claim 15, wherein said metadata comprises data relating to a connection between two or more nodes of the dependency graph.

19. The program storage device of claim 15, wherein said step of controlling access comprises granting a single read-write access lock for one of the two or more nodes to one of the multiple users on the network.

20. The program storage device of claim 15, wherein said step of controlling access comprises granting multiple read-only access locks to more than one of the multiple users on the network.

21. The program storage device of claim 15, wherein said method further comprises utilizing an application programming interface (API) to access the relational database, selecting a variation of one of the two or more nodes of the dependency graph, and previewing a rendering sequence using the selected variation.

22. The method of claim 1 wherein one of the two or more nodes has been modified by creating a new version of the node.

23. The system of claim 8 wherein one of the two or more nodes has been modified by creating a new version of the node.

24. The program storage device of claim 15 wherein one of the two or more nodes has been modified by creating a new version of the node.

* * * * *